United States Patent [19]

Gardina

[11] 3,772,818
[45] Nov. 20, 1973

[54] CRUSTACEAN TRAP
[76] Inventor: Jerome J. Gardina, 10 Sheridan St., Brockton, Mass. 02402
[22] Filed: Aug. 5, 1971
[21] Appl. No.: 169,288

[52] U.S. Cl. ..................................... 43/100, 43/17
[51] Int. Cl. ...................... A01k 69/08, A01k 97/12
[58] Field of Search ....................... 43/100, 102, 65, 43/17, 6.5, 58, 8

[56] References Cited
UNITED STATES PATENTS
| 586,863 | 7/1897 | Nelson | 43/102 |
| 1,903,276 | 3/1933 | Yanga | 43/102 |
| 3,426,472 | 2/1969 | Richard | 43/100 |

Primary Examiner—Warner H. Camp
Attorney—Kenneth R. Stevens

[57] ABSTRACT

A crustacean-type trap comprising a stable base member for supporting a plurality of compartmented sections and including first tracking means located on a trap capable of engagement with second tracking means located on a harvesting vessel. The first and second tracking means being adapted for relative movement with respect to each other so as to allow removal of entrapped crustaceans from the plurality of compartmented sections. Automatically releasable indicator means attached to the trap prevents unauthorized crustacean removal until the vessel reaches the harvesting area.

6 Claims, 5 Drawing Figures

PATENTED NOV 20 1973                          3,772,818
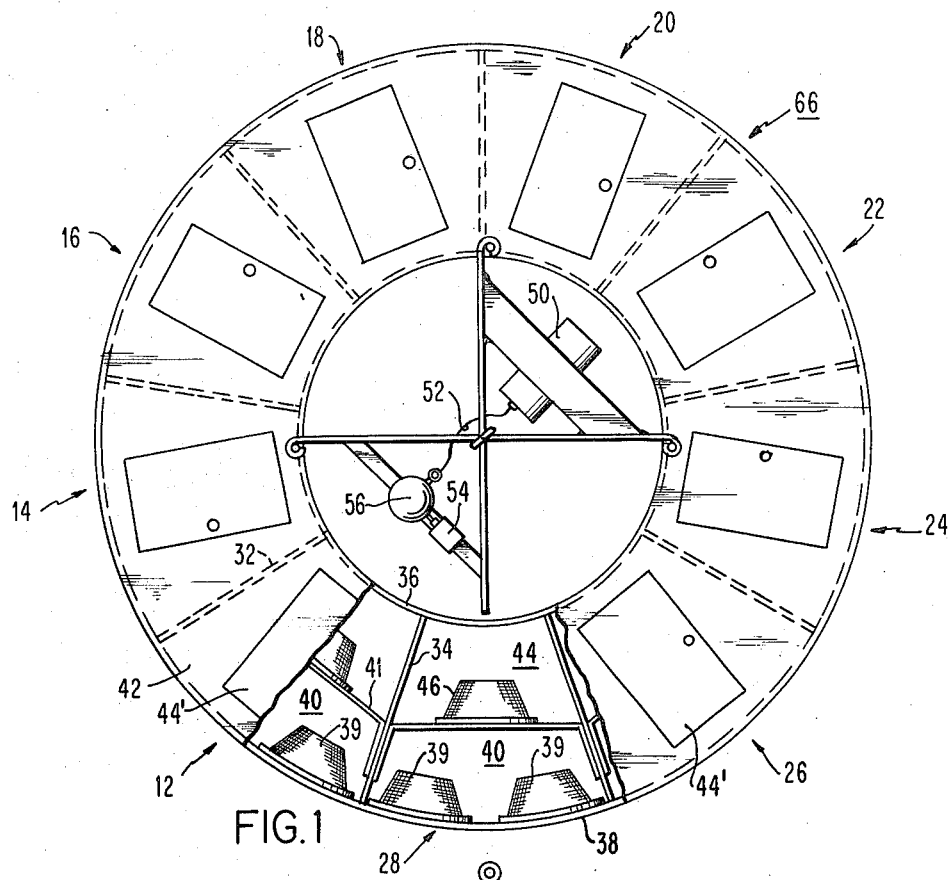
FIG. 1
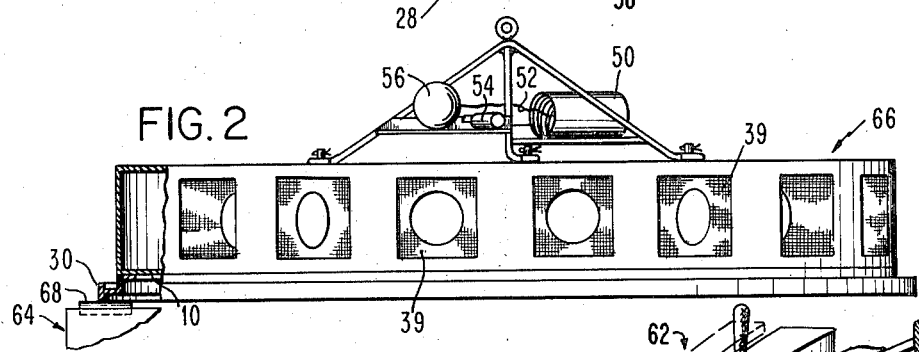
FIG. 2
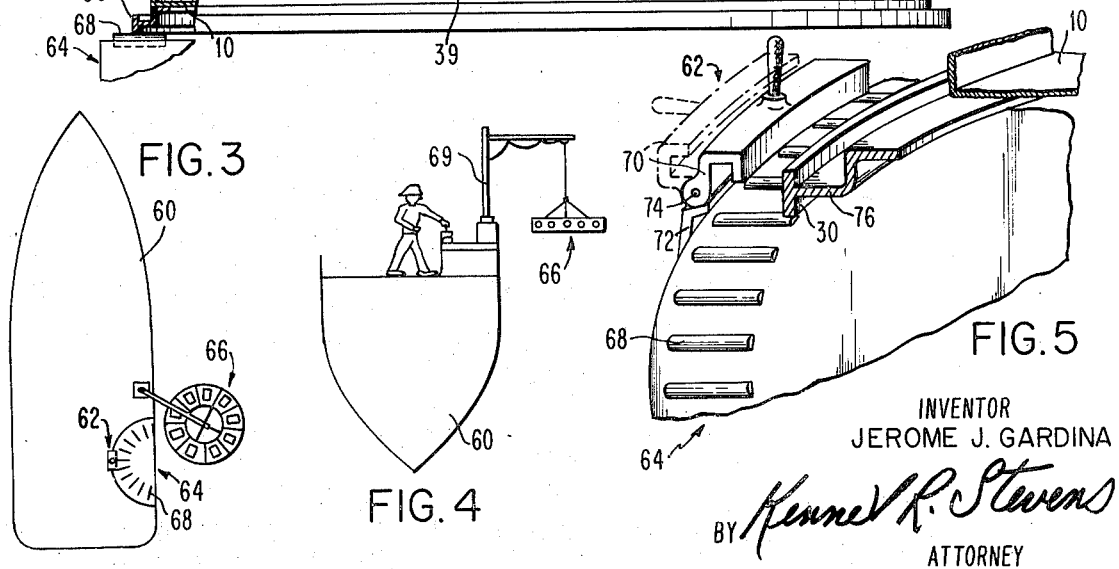
FIG. 3
FIG. 4
FIG. 5
INVENTOR
JEROME J. GARDINA
BY *Kenne R. Stevens*
ATTORNEY

CRUSTACEAN TRAP

BACKGROUND OF THE INVENTION

Crustacean harvesting is an extremely expensive and cumbersome operation. Evolution of progress in this trade is substantially nonexistent.

Existing traps are difficult to retrieve from the ocean floor, and are extremely susceptible to damage by virtue of storm action. Moreover, present day traps possess limited capacity which further accentuates the aforementioned problems, and thus, makes the overall operation extremely expensive.

BRIEF DESCRIPTION OF THE DRAWINGS

FIG. 1 shows a plan view, partially broken away, and illustrates the multi-compartmented sections of the present crustacean trap;

FIG. 2 is a front view of FIG. 1, partly in section, and better illustrates the details of the automatic release indicator means;

FIGS. 3 and 4 are schematic illustrations, broadly showing the manner of retrieving and positioning the crustacean trap of the present invention;

FIG. 5 is a perspective view illustrating a preferred embodiment of the tracking means employed for servicing the crustacean trap of the present invention.

SUMMARY OF THE INVENTION

Therefore, it is an object of the present invention to provide a crustacean trap having increased capacity.

Another object of the present invention is to provide a crustacean trap which is extremely stable and resistant to storm damage.

Another object of the present invention is to provide a crustacean trap which protects against unauthorized use and is readily and economically serviceable from the harvesting vessel.

The present crustacean trap invention comprises a stable base member for supporting a plurality of serviceable compartmented sections. First and second tracking means associated with the trap and the harvesting vessel allow for efficient removal of the entrapped crustaceans. Automatically triggered release indicator means on the trap prevents unauthorized harvesting.

DETAILED DESCRIPTION

Now referring to FIGS. 1 and 2, they illustrate the general trap structure of the present invention. The trap comprises a peripheral base member 10 for supporting nine separate main sections 12, 14, ... 28. The base member 10 terminates in a T-shaped flange portion 30. The T-shaped flange 30 forms a part of a tracking system, as more fully described in connection with FIG. 5.

Each of the sections 12, 14, ... 28 include a front wall, a pair of side walls and a back wall, for example, as shown at 38 32, 34, and 36, respectively. Also, within each front wall 38 as illustrated in section 28, a pair of openings of suitable diameter are formed in order to accommodate a pair of commercially available entrance mesh nets, generally depicted at 39, which provide access to first subsection or room 40. An angled portion 41 having a suitable opening formed therein extends the full height of each main section so as to form a second subsection or room 44. Similarly, a suitable mesh net 46 provides one-way access from the first subsection to the second subsection.

The individual sections also include a top access portion 42 which includes a hingedly mounted door 44'. The door 44' easily swings open to facilitate removal of trapped crustaceans.

With the exception of the T-shaped tracking portion 30, the specific construction of the base member the side and back walls and the top access portion are not shown, since the specific structural implementation in itself does not form part of the present invention. Also, for puspose of clarity, only the general structural element numerical designations for section 12 and 28 are shown as the remainder of sections are identical.

Many variations in the type of construction and selection of materials are possible within the ordinary skill of one in the art. Of course, the artisan would be required to take into account some of the following factors: the corrosive nature of the selected material to sea water, the durability and weight of the material, the size of the harvesting vessel in relationship to the weight of the trap, and the ocean depth in which the trap is to function. In light of these considerations, it is clear that the materials might include light metals having a nonmetallic sea water protective coating, e.g. plastic.

In order to protect and locate the traps, each one is outfitted with a sonar operated buoy releasable system. Affixed support members 50 hold a line storage reel in which is contained a line 52 attached to a sonar release mechansim 54, and then to a float 56.

When the sonar release mechanism receives the signal sent from the ship, the same is caused to be retracted permitting the float 56 to rise thereby carrying with it the line 52 which is payed out of the storage reel. The float marks the location of the trap 66.

FIGS. 3, 4 and 5 illustrate the general and specific tracking means for gaining access to a loaded trap.

In the specific embodiment, each vessel 60 is outfitted with a semicircular first tracking means 62 and an associated second tracking means generally shown at 64, and more particularly in FIG. 5. Each trap 66 is raised by a crane assembly 69 from the ocean floor onto the track means 64.

The tracking means 64 and the trap 66 are interlocked by means of the semicircular first tracking means 62 so as to allow the bottom of the base member 60 to rotate on a plurality of rollers 68. This arrangement provides positive engagement regardless of ocean conditions so as to facilitate access to each of the trap access doors 44'.

FIG. 5 illustrates the specific tracking means 62 for engaging the flange portion 30. A hingedly mounted channel comprising upper member 70 and lower member 72 is mounted on the vessel. The upper member 70 and lower member 72 are joined by way of a pin 74 which extends through the members in order to allow the top member to be opened, as illustrated in phantom lines. Once the T-shaped flange portion of member 30 is inserted into the open channel formed by members 70 and 72, upper member is closed and locked into position using well-known locking mechanism (not shown).

Lower member 72 is secured to the fixed portion 64 of the tracking means and forms a pivotal support for upper member 70. Upper member 70 engages the upper portion of flange 30 and retains it within the confines thereof while permitting its lower portion to engage the rollers 68 to thereby permit the same to rotate. Rotation of the trap permits the unloading of the trapped crustacean from each of the compartments via the doors 44'.

The dimension of flange 30 is appropriately selected in order that the horizontal member 76 be supported by the rollers 68 in the closed position. In this manner, the entire trap can be easily rotated.

Accordingly, the present invention provides an extremely stable and economically advantageous crustacean trap. Its stability against storm turbulence is particularly well suited for deep ocean locations, and thus, particularly accommodating for harvesting "king" lobsters which inhabit the deep depths of the ocean floor. Moreover, its multi-compartmented aspects allow for a more bountiful harvest with minimum labor, costs, and chance of trap pirating.

Finally, the automatic sonar float release mechanism allows the trap to be safely deposited in a harvesting area without detection. When returning to the general area to service each trap, a sonar signal from the harvesting vessel actuates the sonar responsive mechanism 54 so as to release the float 56. In this manner, the harvesting crew can specifically identify the trap location prior to raising it onto the track means 64.

Although the invention has been described with a certain degree of particularity, it is understood that the present disclosure has been made only by way of example and that numerous changes in the details of construction and the combination and arrangement of parts may be made without departing from the spirit and the scope of the invention as hereinafter claimed.

What is claimed is:

1. A crustacean trap comprising:
   a. a stable base member having a bottom portion for resting on an ocean floor,
   b. a plurality of enclosed housing means mounted on said base member,
   c. each of said enclosed housing means including openings having first tunnel means attached thereto for allowing one-way passage of crustaceans into said enclosed housings,
   d. said base member including first tracking means,
   e. said tracking means located on a harvesting vessel, rotatable means mounted on one of said tracking means, whereby said first and second tracking means engage and rotate with respect to each other in order to facilitate removal of trapped crustaceans from said enclosed housing.

2. A crustacean trap as in claim 1 wherein:
   a. each of said enclosed housings include a partition means for forming a first and a second section, said partition means including an opening having second tunnel means attached thereto for providing a one-way passage of crustaceans into said second section.

3. A crustacean trap as in claim 1 further including:
   a. means attached to the trap, and being responsive to a remote signal source, for automatically releasing an indicator for identifying a submerged trap location.

4. A crustacean trap as in claim 1 wherein:
   a. said base member includes a substantially circular peripheral portion.

5. A crustacean trap as in claim 4 wherein said base member includes a substantially flat bottom portion for providing a stable state for resting on an ocean floor.

6. A crustacean trap as in claim 5 wherein:
   a. said first tracking means includes a continuous track located at said peripheral portion and adapted for positive locking engagement with the second tracking means located on the harvesting vessel for maintaining said flat bottom portion in substantially intimate contact with said rotatable surface means located on the harvesting vessel.

* * * * *